(12) United States Patent
Lwo (10) Patent No.: US 9,529,820 B2
(45) Date of Patent: Dec. 27, 2016

(54) AUTOMATED CONTENT TRACKING AND CONVERSION

(75) Inventor: Fuhwei Lwo, Redmond, WA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1771 days.

(21) Appl. No.: 12/125,995

(22) Filed: May 23, 2008

(65) Prior Publication Data

US 2009/0292994 A1    Nov. 26, 2009

(51) Int. Cl.
| | |
|---|---|
| G06F 3/0486 | (2013.01) |
| G06F 17/30 | (2006.01) |
| G06F 3/0482 | (2013.01) |
| G06F 9/54 | (2006.01) |

(52) U.S. Cl.
CPC ....... G06F 17/30179 (2013.01); G06F 3/0482 (2013.01); G06F 3/0486 (2013.01); G06F 9/543 (2013.01); G06F 17/30882 (2013.01)

(58) Field of Classification Search
CPC .. G06F 3/0486; G06F 9/543; G06F 17/30882; G06F 3/0482
USPC ........ 715/810, 769, 770, 804, 805, 752, 847
See application file for complete search history.

(56) References Cited

U.S. PATENT DOCUMENTS

| | | | | |
|---|---|---|---|---|
| 5,809,179 | A * | 9/1998 | Marimont et al. ............ | 382/254 |
| 5,959,717 | A * | 9/1999 | Chaum ............................ | 352/40 |
| 7,020,601 | B1 * | 3/2006 | Hummel et al. ................. | 704/2 |
| 7,028,253 | B1 * | 4/2006 | Lieberman et al. .......... | 715/232 |
| 7,085,780 | B2 * | 8/2006 | Sakamoto ......... | G06F 17/30371 |
| 7,203,930 | B1 * | 4/2007 | Kirkpatrick et al. ......... | 717/125 |
| 7,424,676 | B1 * | 9/2008 | Carlson et al. ............... | 715/273 |
| 7,539,976 | B1 * | 5/2009 | Ousterhout et al. .......... | 717/120 |
| 2002/0144026 | A1 * | 10/2002 | Dunlap et al. .................. | 710/16 |
| 2002/0147972 | A1 * | 10/2002 | Olmeda et al. ............... | 717/174 |
| 2002/0184041 | A1 * | 12/2002 | Muller ............................. | 705/1 |
| 2003/0097454 | A1 * | 5/2003 | Yamakawa et al. .......... | 709/229 |
| 2004/0260710 | A1 * | 12/2004 | Marston ............... | G06Q 10/107 |
| 2005/0086211 | A1 * | 4/2005 | Mayer ............................. | 707/3 |
| 2005/0119871 | A1 * | 6/2005 | Deffler ............................ | 703/22 |
| 2005/0210401 | A1 * | 9/2005 | Ketola et al. ................. | 715/770 |
| 2006/0064599 | A1 * | 3/2006 | Yoshida ........................ | 713/182 |
| 2006/0116994 | A1 * | 6/2006 | Jonker et al. ..................... | 707/3 |
| 2006/0187897 | A1 * | 8/2006 | Dabbs et al. ................. | 370/349 |
| 2006/0200477 | A1 * | 9/2006 | Barrenechea ................ | 707/100 |
| 2007/0078948 | A1 * | 4/2007 | Julia et al. .................... | 709/217 |
| 2007/0106419 | A1 * | 5/2007 | Rachamadugu .............. | 700/188 |
| 2007/0112921 | A1 * | 5/2007 | Lunt et al. .................... | 709/206 |
| 2007/0208762 | A1 * | 9/2007 | Lunt et al. .................... | 707/100 |
| 2007/0256059 | A1 * | 11/2007 | Sullivan et al. .............. | 717/139 |

(Continued)

OTHER PUBLICATIONS

W3C, XML Path Language (XPath), web page/site, Printed from website on May 15, 2008, pp. 1-37, Version 1.0.

(Continued)

*Primary Examiner* — Steven Sax
(74) *Attorney, Agent, or Firm* — Lee Law, PLLC; Christopher B. Lee (57) ABSTRACT

Source file information is associated with source file content in response to a copy operation of the source file content from a source file. An automated conversion of the source file content to a form compatible with a target file is performed based upon differences between the source file information and target file information in response to a paste operation.

15 Claims, 6 Drawing Sheets

(56) References Cited

U.S. PATENT DOCUMENTS

| | | |
|---|---|---|
| 2008/0052290 A1* | 2/2008 | Kahn et al. ........................ 707/8 |
| 2008/0174485 A1* | 7/2008 | Carani et al. ............ 342/357.07 |
| 2008/0198488 A1* | 8/2008 | Shimada et al. ................ 360/15 |
| 2008/0235609 A1* | 9/2008 | Carraher et al. .............. 715/769 |
| 2009/0044140 A1* | 2/2009 | Chen et al. ................... 715/770 |
| 2009/0100099 A1* | 4/2009 | Buckwalter ................ 707/104.1 |
| 2010/0250490 A1 | 9/2010 | Mcdowall |

OTHER PUBLICATIONS

W3C, XSL Transformations (XSLT), web page/site, Printed from website on May 15, 2008, pp. 1-57, Version 1.0.

Wikipedia, Clipboard (software), web page/site, RPrinted from website on May 15, 2008, pp. 1-3.

Author Unknown, Clipboard Overviews, Microsoft Developer Network Webpage, Apr. 24, 2008, p. 1, Microsoft Corporation, Retrieved from archived website at: http://web.archive.org/web/20080424054811/http://msdn2.microsoft.com/en-us/library/ms674548.aspx.

* cited by examiner

AUTOMATED CONTENT TRACKING AND CONVERSION

BACKGROUND OF THE INVENTION

Field of the Invention

The present invention relates to systems and methods for providing additional behavior in association with copy and paste operations. More particularly, the present invention relates to automated content tracking and conversion.

Related Art

Computer software applications have copy and paste operations that allow users of the software applications to move text either from one place to another within an application or file, or to move the text from one application or file to another. To move the text, a user highlights the text to be copied and invokes the copy operation. The copy operation traditionally places the text to be copied into a memory location known as a clipboard. The paste operation moves the text from the clipboard to a location selected by the user within the same or another application or file.

Short cut keys, such as CTRL-C and CTRL-V, have been used to allow keystroke entry of copy and paste operations, respectively. Alternatively, the copy and paste functions may be invoked by menu-based selection of the respective functions.

BRIEF SUMMARY OF THE INVENTION

The subject matter described herein provides automated conversion of text from one format to another based upon differences between source and target file or application types without human intervention. The automated conversion allows, as one example, automated conversion from one computer programming syntax to another computer programming syntax during a copy and paste sequence without human intervention to convert the syntax. Automated content tracking capabilities allow tracking of copied content for security purposes. The automated content tracking may be based upon the type of content that is being copied or upon recognition of other indicia, such as the target file type being an email message. Services, such as verification of converted content, compilation, linking, uploading, downloading, execution of converted content, or other services may also be automatically performed. Network services, such as a initiating a web browser or web search, may be automatically invoked using selected text or converted text in response to a copy or paste operation, respectively.

A method includes associating source file information with source file content in response to a copy operation of the source file content from a source file, and performing an automated conversion of the source file content to a form compatible with a target file based upon differences between the source file information and target file information in response to a paste operation.

A system includes a memory adapted to store information and procedures for execution in association with copy and paste operations, and a computing device adapted to associate source file information with source file content in response to a copy operation of the source file content from a source file, store the source file information to the memory, and perform an automated conversion of the source file content to a form compatible with a target file based upon differences between the source file information and target file information using at least one of the procedures stored in the memory.

An alternative system includes a database adapted to store content tracking information and procedures for execution in association with copy and paste operations, a memory adapted to store content associated with the copy and paste operations, and a computing device adapted to execute an application adapted to track the content associated with the copy and paste operations, wherein the application is further adapted to associate source file information with source file content in response to a copy operation of the source file content from a source file, store the source file information to the database, store the source file content to the memory, perform an automated conversion of the source file content to a form compatible with a target file based upon differences between the source file information and target file information using at least one of the procedures stored in the database, associate the converted source file content with the target file, generate an automated content tracking alert that identifies at least the source file in response to the copy operation, and forward the automated content tracking alert to a monitor module within a network.

A computer program product includes a computer useable medium including a computer readable program. The computer readable program when executed on a computer causes the computer to associate source file information with source file content in response to a copy operation of the source file content from a source file, and perform an automated conversion of the source file content to a form compatible with a target file based upon differences between the source file information and target file information in response to a paste operation.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated conversion of text from one format to another based upon differences between source and target file or application types without human intervention. The automated conversion allows, as one example, automated conversion from one computer programming syntax to another computer programming syntax during a copy and paste sequence without human intervention to convert the syntax. Automated content tracking capabilities allow tracking of copied content for security purposes. The automated content tracking may be based upon the type of content that is being copied or upon recognition of other indicia, such as the target file type being an email message. Services, such as verification of converted content, compilation, linking, uploading, downloading, execution of converted content, or other services may also be automatically performed. Network services, such as a initiating a web browser or web search, may be automatically invoked using selected text or converted text in response to a copy or paste operation, respectively.

Figure 1:
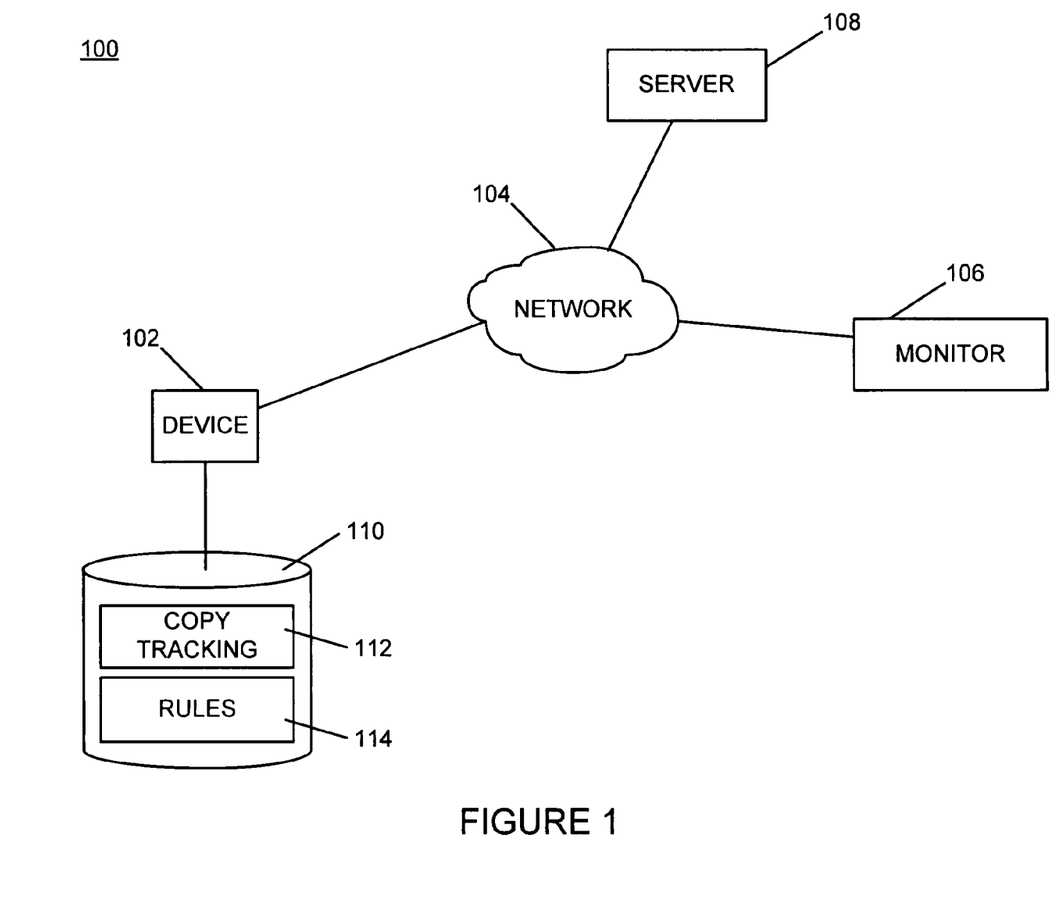
FIG. 1 illustrates an example of an implementation of a block diagram of a system for automated copy tracking, automated conversion of copied content, and for the automated execution of additional behavior in response to either a copy operation or a paste operation according to an embodiment of the present subject matter.

FIG. 1 illustrates an example of an implementation of a block diagram of a system 100 for automated copy tracking, automated conversion of copied content, and for the automated execution of additional behavior in response to either a copy operation or a paste operation. Within the system 100, a computing device 102 is illustrated interconnected via a network 104 to a monitor 106 and a server 108. The computing device 102 provides for automated processing and conversion of content and for automated execution of additional behavior in response to copy and paste operations performed by a user of the computing device 102. The monitor 106 acts in conjunction with the computing device 102 to provide automated content tracking capabilities within the system 100 for content associated with copy and paste operations. The server 108 provides web and other services in response to copy and paste operations performed by the user of the computing device 102.

It should be noted that the computing device 102, the monitor 106, and the server 108 may be any computing device capable of processing information as described above and in more detail below. For example, the computing device 102, the monitor 106, and the server 108 may include devices such as a personal computer, a network server, a cellular telephone, a personal digital assistance (PDA), an email device, a music recording or playback device, or any other device capable of processing information as described in more detail below. Additionally, the computing device 102, the monitor 106, and the server 108 may be co-located or distributed geographically. The network 104 includes any form of interconnection suitable for the intended purpose, including a private or public network such as an intranet or the Internet, respectively, direct inter-module interconnection, or any other interconnection mechanism capable of interconnecting the devices.

A database 110 is associated with the computing device 102 and provides storage capabilities for information associated with the automated copy tracking, automated conversion of copied content, and for the automated execution of additional behavior in response to either a copy operation or a paste operation. The database 110 includes a copy tracking table 112 and a rules table 114. The copy tracking table 112 stores information associated with copy operations performed via the computing device 102. For example, the copy tracking table 112 may be used to store information associated with copied text, such as information identifying a syntax or programming language associated with the copied text. Additionally, the copy tracking table 112 may store a file type or file extension associated with a file from which the text is copied. For example, if the source format for a portion of text is hypertext markup language (HTML), then the copy tracking table 112 may store either a file extension of ".htm" or ".html," or may store a reference to the HTML syntax in association with a copy operation. In this way, the copy tracking table 112 may document information associated with a source of information accessed during the copy operation. As will be described in more detail below, the information stored in the copy tracking table 112 may also be accessed and used by the monitor 106 for content tracking during copy and paste operations performed via the computing device 102.

The rules table 114 stores information associated with actions or conversions to be performed upon or based upon the copied content in response to a copy or paste operation. The actions or conversions may be based upon information stored within the copy tracking table 112 during a copy operation. Additional actions may be based upon the characters or information contained within the copied content. Rules stored within the rules table 114 may be created by a user of the computing device 102 or may be stored to the rules table 114 via a remote operation initiated by the monitor 106. In this manner, a dynamic rule-based set of operations may be created for automated copy tracking and for automated conversion of copied content along with automated execution of additional behavior in response to a copy operation or a paste operation.

Continuing with the example provided above, if the source format was HTML and the desired target format is another syntax, such as Java, the rules table 114 may store or reference an appropriate conversion algorithm or process, such as a stylesheet, to convert the HTML syntax to Java syntax. As such, the rules table 114 works in association with the copy tracking table 112 to provide rules that may be used by the computing device 102 for automated conversion of copied content from any source format or syntax to any target format or syntax.

The rules table 114 may also store rules associated with additional activities beyond conversion of text. These rules may be processed based upon the content of copied text. For example, the computing device 102 may be configured to automatically perform these additional activities associated with rules stored within the rules table 114 based upon analysis of the copied content. Additionally, a rule instructing the computing device 102 to start a web browser, perform a web search, or access a particular web site may be processed in response to a determination that the copied content includes a uniform resource locator (URL) or other web-based indicator.

The computing device 102 may also be configured to initiate other processing activities associated with the converted text. For example, a compilation operation may be performed on a target file that includes converted source content based upon a rule defined within the rules table 114. The computing device 102 may also be initiate a linking operation of the target file including converted source content to link it with other object modules to form an executable, download or upload a resulting executable file or script to an execution platform such as the server 108, start execution of a resulting executable or script, or initiate any other processing that may be available for a target file including the converted source content. These additional actions may be enabled or disabled by either the computing device 102 or the monitor 106

As such, the system 100 provides automated copy tracking, automated conversion of copied content, and the automated execution of additional behavior in response to either a copy operation or a paste operation. These activities may be based upon the content itself and rules may be defined to perform activities based upon either the copy or paste operation itself, or based upon the content of copied or converted text.

Figure 2:
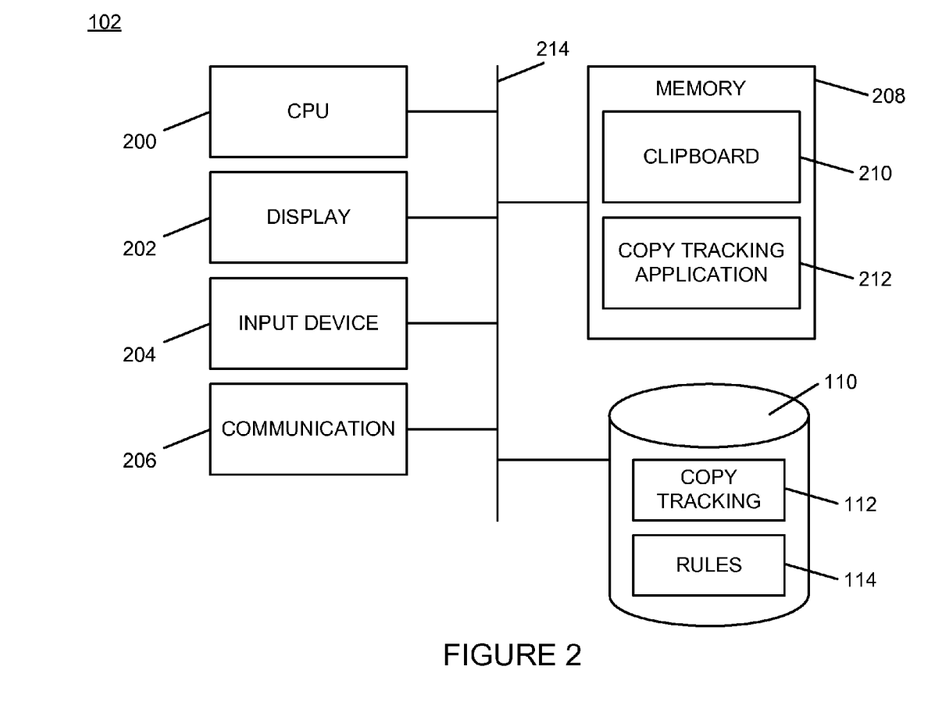
FIG. 2 illustrates an example of an implementation of a block diagram of a computing device that is capable of performing automated copy tracking, automated conversion of copied content, and automated execution of additional behavior in response to either a copy operation or a paste operation according to an embodiment of the present subject matter.

FIG. 2 illustrates an example of an implementation of a block diagram of the computing device 102 that is capable of performing automated copy tracking, automated conversion of copied content, and automated execution of additional behavior in response to either a copy operation or a paste operation. A central processing unit (CPU) 200 provides computer instruction execution, computation, and other capabilities within the computing device 102. A display 202 provides visual information to a user of the computing device 102 and an input device 204 provides input capabilities for the user.

For example, the input device 204 may include a computer keyboard, a keypad, a mouse, a pen, a joystick, or any other type of input device by which the user may identify content represented on the display 202 for copying and by which the user may identify a location within a file or system at which to paste the copied content. A copy or paste operation may be performed by a menu-based operation within a graphical user interface (GUI) displayed on the display 202 or may be performed by invocation of key combinations, such as CTRL-C or CTRL-V, respectively. Additionally, any other method of identifying content for copying and pasting is considered within the scope of the present subject matter.

A communication module 206 provides interconnection capabilities that allow the computing device 102 to communicate with other modules within the system 100, such as the monitor 106 and the server 108. The communication module 206 may include any electrical, protocol, and protocol conversion capabilities useable to provide the interconnection capabilities.

A memory 208 includes a clipboard 210 that stores copied content. The memory 208 also includes a copy tracking application 212. The copy tracking application 212 includes one or more conversion and/or tracking engines (not shown) that perform the automated copy tracking, automated conversion of copied content, and automated execution of additional behavior in response to either a copy operation or a paste operation as described in more detail below. The copy tracking application 212 includes instructions executable by the CPU 200 for performing these functions. The copy tracking application 212 may form a portion of an interrupt service routine (ISR), a portion of an operating system, or a portion of a separate application without departure from the scope of the present subject matter. The copy tracking application 212 may also process rules from the rules table 114 that reference other applications to be invoked in association with performance of activities associated with copy and paste operations.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area suitable for storage of the clipboard 210 and storage and execution of the copy tracking application 212.

The CPU 200, the display 202, the input device 204, the communication module 206, the memory 208, and the database 110 are interconnected via an interconnection 214. The interconnection 214 may include a system bus, a network, or any other interconnection capable of providing the respective components with suitable interconnection for the respective purpose.

Furthermore, components within the computing device 102 may be co-located or distributed within a network without departure from the scope of the present subject matter. For example, the components within the computing device 102 may be located within a stand-alone device, such as a personal computer (e.g., desktop or laptop) or handheld device (e.g., cellular telephone, personal digital assistant (PDA), email device, music recording or playback device, etc.). For a distributed arrangement, the display 202 and the input device 204 may be located at a terminal of a fuel pump, point of sale device, or kiosk, while the CPU 200 and memory 208 may be located at a local or remote server. Many other possible arrangements for components of the computing device 102 are possible and all are considered within the scope of the present subject matter. It should also be understood that, though the copy tracking table 112 and a rules table 114 are shown within the database 110, they may also be stored within the memory 208 without departure from the scope of the present subject matter.

The examples presented below use text conversion within one system with one operating system for ease of illustration purposes. However, it is understood that the present subject matter is not limited to conversion of source file content between two files or file/syntax types on a single system. Accordingly, conversion between different systems, such as between one system executing a first operating system with a first file format and another system executing a second operating system with a second file format, are considered to be within the scope of the present subject matter. Furthermore, the content may include text, object code, executable code, scripts, or any other content without departure from the scope of the present subject matter.

Figure 3:
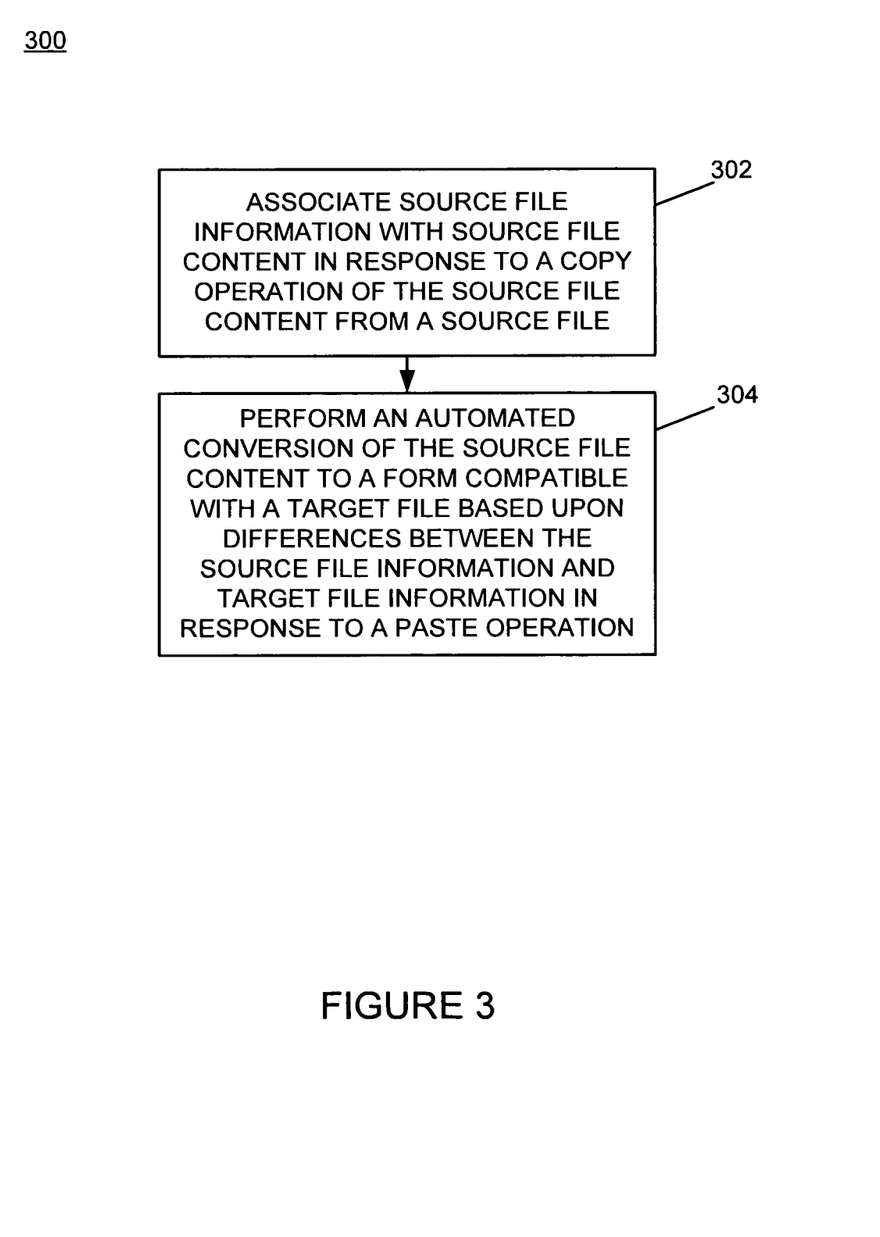
FIG. 3 illustrates an example of an implementation of a flow chart of a process for performing automated copy tracking and automated conversion of copied content in response to copy and paste operations according to an embodiment of the present subject matter.

FIG. 3 illustrates an example of an implementation of a flow chart of a process 300 for performing automated copy tracking and automated conversion of copied content in response to copy and paste operations. At block 302, the process 300 associates source file information with source file content in response to a copy operation of the source file content from a source file. For example, the copy tracking application 212 may store an entry in the copy tracking table 112 in response to a copy operation. The entry stored within the copy tracking table 112 may include a source file format, file extension, file type, or any other information associated with the source file content. This entry may then be used during a paste operation to provide automated tracking, conversion, and automated execution of additional behavior in response to the paste operation.

At block 304, the process 300 performs an automated conversion of the source file content to a form compatible with a target file based upon differences between the source file information and target file information in response to a paste operation. Continuing with the example illustrated above, if the source format was HTML and the desired target format is Java, the process 300 may perform an automated conversion by executing an appropriate conversion algorithm to convert the HTML syntax to Java syntax by generating escape sequences for segments of the converted HTML syntax that would otherwise be flagged as syntax errors in Java. Accordingly, the process 300 performs automated copy tracking and automated conversion of copied content in response to copy and paste operations.

As described above, automated conversions performed upon the source file content in response to copy and/or paste operations may be stored as rules within the rules table 114. The following Table 1 illustrates an example of an implementation of the rules table 114 stored within the database 110.

TABLE 1

Example Rules Table

| RULE TYPE | RULE DESCRIPTION | SOURCE TYPE | TARGET TYPE | RULE CONTENT | RULE ENGINE |
|---|---|---|---|---|---|
| Paste | XML → Java | XML | Java | <xsl:stylesheet> | XSLT processing engine |
| Paste | * → Email | * | Email | Send Message to Monitor | Notification Engine |
| Copy | Start Browser | URL | N/A | Invoke Browser | Default Browser |
| Copy | Web Search | * | Search Engine | Invoke Search Engine in Browser | Default Search Engine |
| . . . | Catch-all Rule | * | * | User-defined Rules | User-defined Engine |

As can be seen from Table 1, rules are represented within rows of the rules table 114. A rule type field for each rule represents whether the rule is to be applied during a copy operation or a paste operation. A rule description field may be any user-defined set of characters to represent the rule to be applied. A source type field and the target type field may include any file type, syntax type, or system type. A rule content field includes additional content used to process the rule. A rule engine field references an executable code segment, such as a .exe, .dll, or Java class file or script that executes in response to the rule being invoked during the respective copy or paste operation. This rule engine may be a portion of the copy tracking application 212, such as a function call, or may be a separate script or application. It should be noted that a similar table may be created to represent contents stored within the copy tracking table 112.

To provide a further example of rule processing, a detailed example of the first paste rule within Table 1 follows. By reference to Table 1, when the source type is XML and the target type is Java, an "XSLT processing engine" executes using a "<xsl:stylesheet>" sytlesheet as the rule content. As described above, the XSLT processing engine may form a portion of the copy tracking application 212 or may be a separate script or application invoked by the copy tracking application 212 in response to a paste operation between a source XML file and a target Java file.

The following pseudo code represents an example of the stylesheet "<xsl:stylesheet>" referenced within the first paste rule of Table 1 that may be used by the copy tracking application 212 to convert HTML syntax to Java syntax.

```
<?xml version="1.0" encoding="ISO-8859-1" ?>
- <xsl:stylesheet version="1.0"
  xmlns:xsl="http://www.w3.org/1999/XSL/Transform">
  <xsl:output method="text" indent="yes" />
- <!-- Template for the XSLT root node -->
- <xsl:template match="/">
  <xsl:text>String xmlString=</xsl:text>
  <xsl:apply-templates />
  <xsl:text>;</xsl:text>
  </xsl:template>
- <!-- Tempalte for all the attributes -->
- <xsl:template match="@*">
  <xsl:text />
  <xsl:value-of select="name( )" />
  <xsl:text>=\"</xsl:text>
```

-continued

```
  <xsl:value-of select="." />
  <xsl:text>\"</xsl:text>
  </xsl:template>
- <!-- Template for the first element -->
- <xsl:template match="/*[1]">
  <xsl:text>"<</xsl:text>
  <xsl:value-of select="name( )" />
  <xsl:apply-templates select="@*" />
  <xsl:text>/></xsl:text>
  </xsl:template>
  </xsl:stylesheet>
```

As can be seen from this example pseudo code of the stylesheet <xsl:stylesheet>, the output method is text. When XML text is found within content to be converted and pasted to a Java target, the first operation in the conversion process is to precede the XML text with the "String xmlString" delimiter. Additionally, the XML string is placed within quotes after an equal sign (e.g., "="). Furthermore, any double quotes within the XML text are escaped with a backslash character (e.g., "\"). More complex stylesheets may be created and all are considered within the scope of the present subject matter.

The following text represents an example HTML string that may be converted using the stylesheet pseudo code represented above based upon the first paste rule within Table 1.

<p02:stockQuote openPrice="120.00"/>

The following text represents the HTML string after being automatically converted to Java by the copy tracking application 212.

String xmlString="<p02:stockQuote openPrice=\"120.00\"/>";

As can be seen from this example, the HTML string is automatically converted to a form compatible for use on a Java platform by execution of a paste rule in response to a paste operation. Further, the copy tracking application 212 performs this conversion without human intervention. The first paste rule within Table 1 illustrates that when the source is XML and the target is Java, the XSLT engine executes using the "<xsl:stylesheet>" sytlesheet. Accordingly, a user of the computing device 102 may copy from an HTML file to a Java file and appropriate conversions are performed without having to manually convert the HTML syntax to Java.

Figure 4:
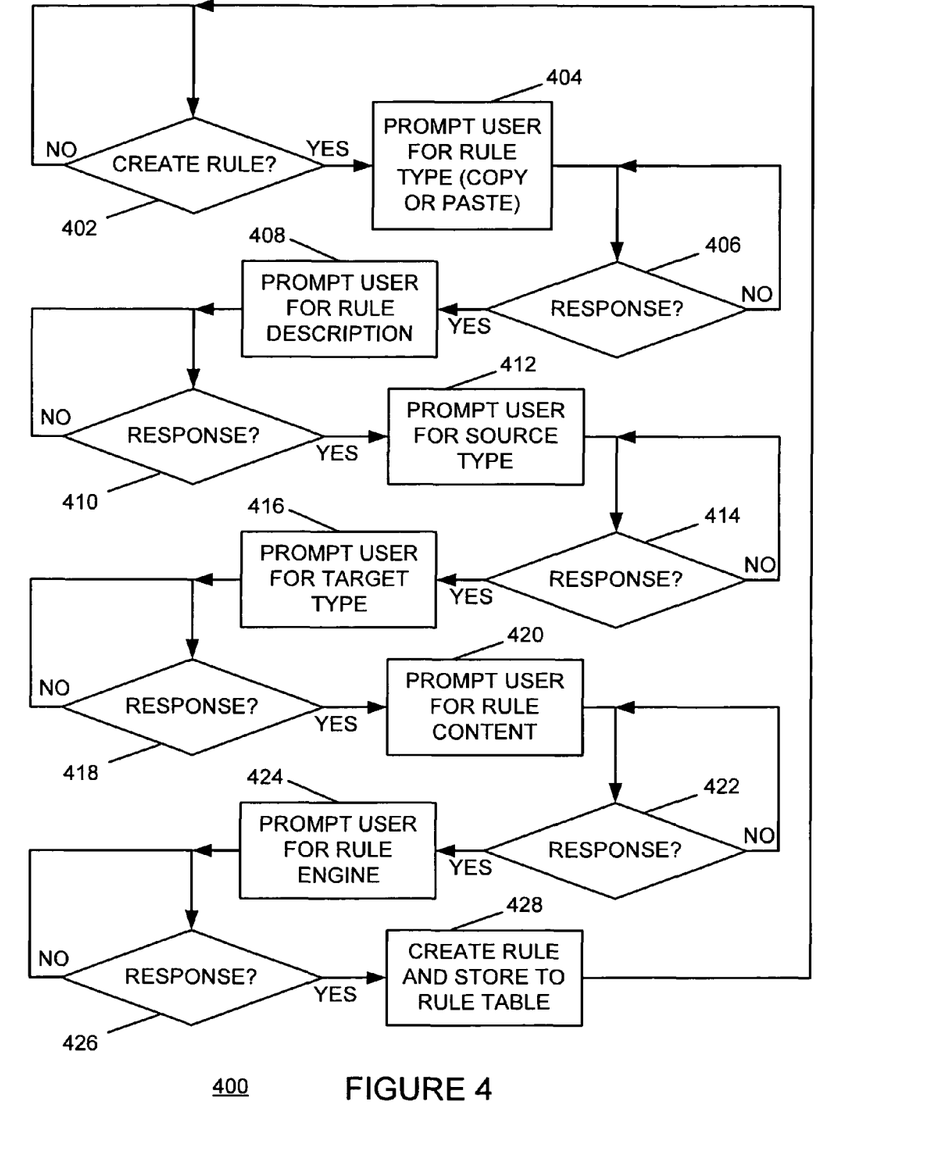
FIG. 4 illustrates an example of an implementation of a flow chart of a process for creating rules to be associated with copy or paste operations and stored to a rules table according to an embodiment of the present subject matter.

FIG. 4 illustrates an example of an implementation of a flow chart of a process 400 for creating rules to be associated with copy or paste operations and stored to a rules table, such as the rules table 114 as illustrated within Table 1 above. When the user of the computing device 102 creates a rule using the process 400, the rule is written locally to the rules table 114. When the user of the monitor 106 creates a rule, the rule is written via messaging or other communication process to the rules table 114. Furthermore, the user of the monitor 106 may create a rule that applies to operations on the computing device 102 without the user of the computing device 102 knowing that the rule has been created. The user of the monitor 106 may additionally enable or disable a given rule without the user of the computing device 102 knowing that the rule has been enabled or disabled. The user of the computing device 102 may also create rules for local use without interruption of any rules defined by the user of the monitor 106. Rules stored within the rules table 114 may be masked by the user of the monitor 106 from viewing and editing by the user of the computing device 102 on a rule-by-rule basis or for all rules created. Any rule created by the user may be performed in addition to any rule defined by the user of the monitor 106 to allow the tracking abilities of the monitor 106 to continue in the presence of rules defined by the user of the computing device 102. Alternatively, the user of the monitor 106 may configure the rules table 114 to cause its rules to preempt rules generated by the user of the computing device 102. A rule creation activity may be initiated by the user of either the computing device 102 or the monitor 106 via a menu operation within a GUI or via any available keystroke combination.

Referring again to FIG. 4, at decision point 402, the process 400 makes a determination as to whether a user of the computing device 102 or a user of the monitor 106 has initiated a rule creation activity. When a determination is made that a user has initiated a rule creation activity, the process 400 prompts the user for the rule type at block 404.

As described above, the rule type may be either a copy rule or a paste rule. The process 400 waits at decision point 406 for the user to respond with the rule type. When the user responds with the rule type, the process 400 prompts the user for a rule description at block 408 and waits at decision point 410 for the user to respond. When the user responds with the rule description, the process 400 prompts the user for a source type at block 412 and waits at decision point 414 for the user to respond. When the user responds with the source type, the process 400 prompts the user for a target type at block 416 and waits at decision point 418 for the user to respond. It should be noted that in certain situations, such as for performing a web search, there may be a target associated with a copy operation to expedite the search and to eliminate a requirement for the user to perform a paste operation to start the search. However, there may not be a target type associated with a copy rule in certain situations. As such, block 416 and decision point 418 may be considered optional steps for creation of a copy rule in those situations or the user may be provided with a default selectable option of no target in those situations.

When a target type is applicable and the user responds with the target type, the process 400 prompts the user for rule content at block 420 and waits at decision point 422 for the user to respond. When the user responds with the rule content, the process 400 prompts the user for rule engine at block 424 and waits at decision point 426 for the user to respond. When the user responds with the rule engine, the process 400 creates the rule and stores the rule to the rules table 114 and returns to await a new rule creation action at decision point 402.

As described above, when a user of the computing device 102 creates a rule, the rule is written locally to the rules table 114. When a user of the monitor 106 creates a rule, the rule is written via messaging or other communication process to the rules table 114. Additionally, any rule that is created may be created within the rules table 114 in a form represented by the example illustrated within Table 1 or may be created in any other convenient format for rule processing.

Figure 5:
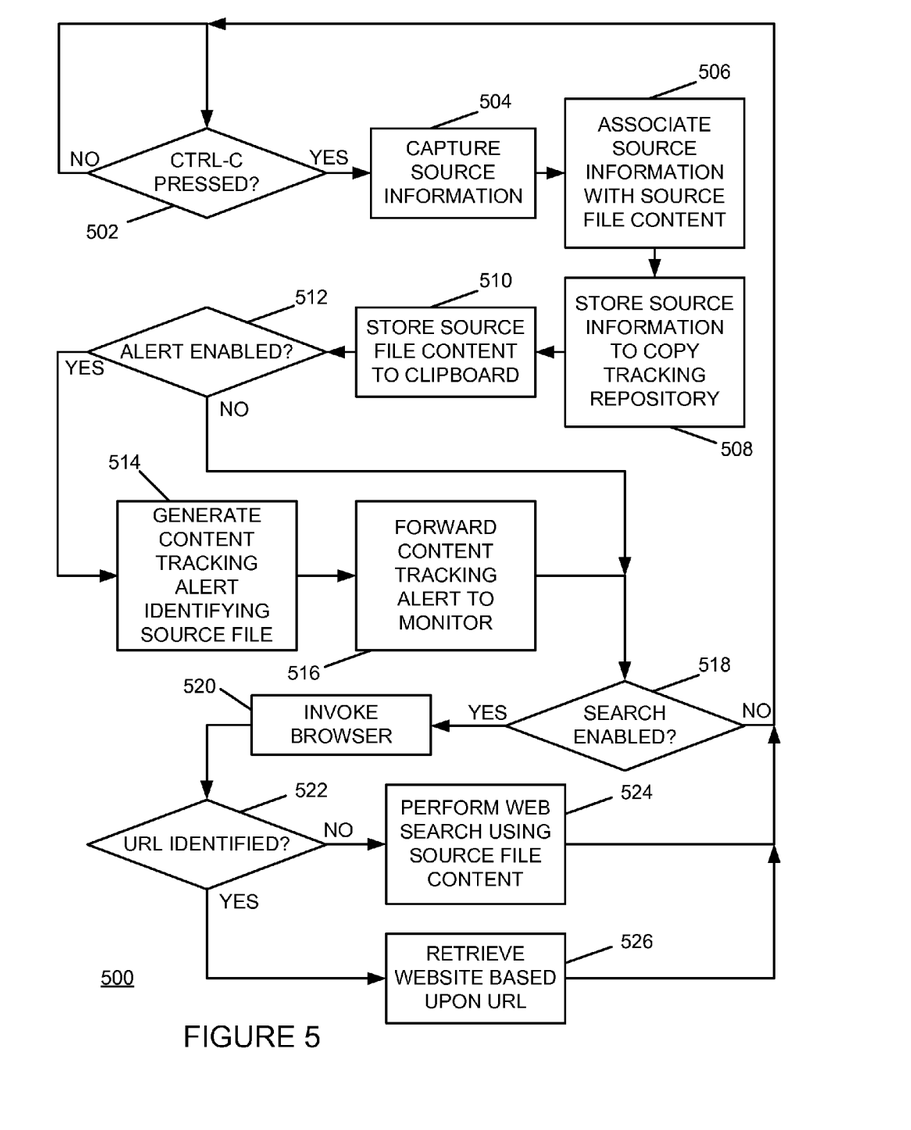
FIG. 5 illustrates an example of an implementation of a flow chart of a process for processing rules associated with a copy operation to provide automated copy tracking, to store information within a copy tracking table to facilitate automated conversion of copied content, and to provide automated execution of additional behavior in the form of a web search or web site access in response to the copy operation according to an embodiment of the present subject matter.

FIG. 5 illustrates an example of an implementation of a flow chart of a process 500 for processing rules associated with a copy operation to provide automated copy tracking, to store information within a copy tracking table to facilitate automated conversion of copied content, and to provide automated execution of additional behavior in the form of a web search or web site access in response to the copy operation. The process 500 waits at decision point 502 for a user of the computing device 102 to initiate a copy operation. In the present example, it is assumed that the user highlighted some text and initiated a copy operation by using the key combination CTRL-C from a keyboard or other keypad device.

When a determination is made that the user of the computing device 102 has initiated a copy operation, the process 500 captures source information at block 504. The source information may include a source file type, source syntax type, or any other source information that may be useful for subsequent conversion, reporting, or additional actions associated with a copy operation or a paste operation.

At block 506, the process 500 associates source file content with the source information. The source file content includes the section of highlighted text in the present example. At block 508, the process 500 stores the source information to a copy tracking repository, such as the copy tracking table 112. The process stores the source file content to a content storage location, such as the clipboard 210 of the computing device 102, at block 510.

At decision point 512, the process 500 determines whether an alert feature is enabled. The alert feature forms a portion of the copy tracking capabilities and may be enabled or disabled by the monitor 106 to allow copy operations to be monitored within the computing device 102 with or without the user knowing that the tracking operation is being performed. The alert feature may be enabled either by creation of a field within the associated copy rule or may be enabled via a register-based or software variable accessible by or associated with the copy tracking application 212. When a determination is made that the alert is enabled, the process 500 generates a content tracking alert identifying the source file at block 514 and forwards the content tracking alert to the monitor 106 at block 516.

After the process 500 forwards the content tracking alert to the monitor 106 or when a determination is made that the alert feature is not enabled at decision point 512, the process 500 makes a determination as to whether a search feature is enabled at decision point 518. As with the alert feature described above, the search feature may be enabled either by creation of an associated copy rule or may be enabled via a register-based or software variable accessible by or associated with the copy tracking application 212. When the process 500 determines that the search feature is not enabled, the process 500 returns to decision point 502 to await a new copy operation.

When a determination is made that the search feature is enabled at decision point 518, the process 500 invokes a browser (not shown) at block 520. At decision point 522, the process 500 makes a determination as to whether the source file content is a URL. When a determination is made that the source file content is not a URL, the process 500 defaults to perform a web search using the source file content at block 524. The web search may be performed using the browser via any search engine that is available. A default search engine may be configured separately or may be specified within the applicable copy rule defined within the rules table 114. When a determination is made that the source file content is a URL, the process 500 initiates retrieval of the website associated with the URL using the browser at block 526.

After either the web search is performed at block 524 or a website is retrieved at block 526, the process 500 returns to decision point 502 to await a new copy operation. It should be understood that many other actions may be associated with the copy operation without departure from the scope of the present subject matter. Accordingly, all are considered within the scope of the present subject matter.

Figure 6:
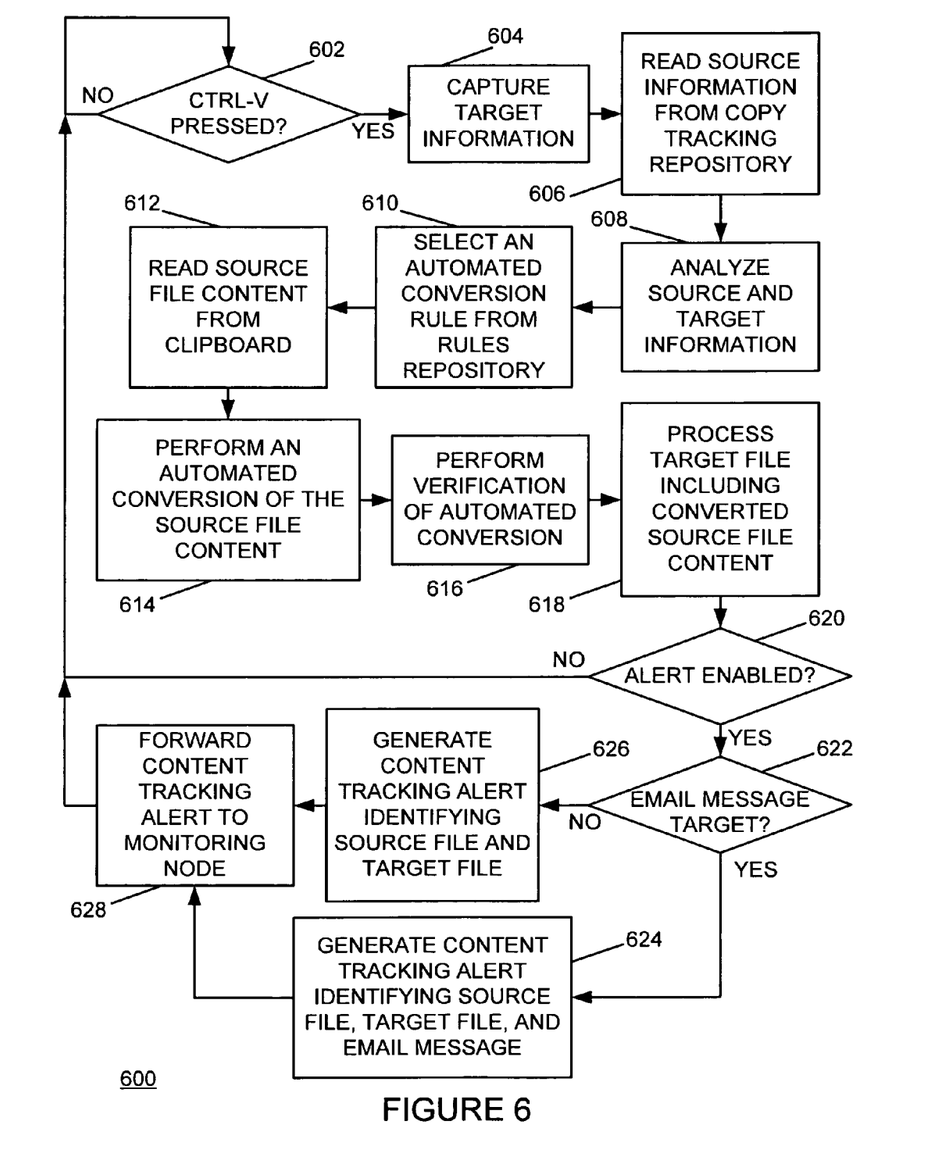
FIG. 6 illustrates an example of an implementation of a flow chart of a process for processing rules associated with a paste operation to provide automated copy tracking and automated conversion of copied content according to an embodiment of the present subject matter.

FIG. 6 illustrates an example of an implementation of a flow chart of a process 600 for processing rules associated with a paste operation to provide automated copy tracking and automated conversion of copied content. The process 600 waits at decision point 602 for a user of the computing device 102 to initiate a paste operation. In the present example, it is assumed that the user placed a text entry point, such as a cursor, at a location within a textual and/or graphical representation of a file and initiated a paste operation by using the key combination CTRL-V from a keyboard or other keypad device.

When a determination is made that the user of the computing device 102 has initiated a paste operation, the process 600 captures target information associated with the target of the paste operation at block 604. The target information may include a target file type, target syntax type, or any other source information that may be useful for conversion, reporting, or additional actions associated with a paste operation.

The process 600 reads source information for the source content associated with the paste operation from a copy tracking repository, such as the copy tracking table 112, at block 606. The information read from the copy tracking repository includes the information stored in association with a copy operation, such as that described in association with FIG. 5 above. At block 608, the process 600 analyzes the source and target information.

Based upon the analysis of the source and target information, the process 600 selects an automated conversion rule from a rules repository, such as the rules table 114, for use in conversion of the source content to a form compatible with the target file type, syntax, or system at block 610. Though not depicted within FIG. 6, the process 600 may include default processing capabilities for use in a situation where a rule is not found within the rules repository. Additionally, the rules table 114 may include default processing rules that perform no conversion and pass pasted content unaltered to the target file, syntax, or system when a matching rule is not found for the source and target.

At block 612, the process 600 reads the source file content from the clipboard. The process 600 performs an automated conversion of the source file content at block 614 based upon the selected automated conversion rule. At block 616, the process 600 performs a verification of the automated conversion. The verification may include evaluation of the converted text for compliance with syntactic guidelines associated with the target syntax or target file type. Additional error handling and processing may be performed in the event of a verification issue. However, for purposes of the present example, it is assumed that the verification process completes without errors.

At block 618, the process 600 processes the target file including the converted source content based upon the selected automated conversion rule. This processing may include initiating a compilation operation for the target file including the converted source content. The processing may also include initiating a linking operation of the target file including the converted source content with other object modules to form an executable, downloading or uploading the resulting executable file or script to an execution platform such as the server 108, starting execution of a resulting executable or script, or initiating any other processing the may be available for the target file including the converted source content.

At decision point 620, the process 600 makes a determination as to whether an alert features is enabled. The alert feature forms a portion of the copy tracking capabilities and may be enabled or disabled by the monitor 106 to allow copy operations to be monitored within the computing device 102 with or without the user knowing that the tracking operation is being performed. The alert feature may be enabled either by creation of a field within the associated paste rule or may be enabled via a register-based or software variable accessible by or associated with the copy tracking application 212. When a determination is made that an alert is not enabled, the process 600 returns to decision point 602 to await another paste operation.

When a determination is made that the alert is enabled, the process 600 makes a determination at decision point 622 as to whether an email message is a target of the paste operation. When a determination is made that an email message is the target, the process 600 generates a content tracking alert identifying the source file, the target file, and that includes the email message itself at block 624. When a determination is made that an email message was not the target, the process generates a content tracking alert identifying the source file and the target file at block 626. At block 628, the process 600 forwards the content tracking alert generated at either block 624 or at block 626 to the monitor 106. The process 600 then returns to decision point 602 to await another paste operation.

As described above in association with FIGS. 1 through 6, the example systems and processes provide automated copy tracking, automated conversion of copied content, and automated execution of additional behavior in response to either a copy operation or a paste operation. The additional behavior within these examples includes invoking network services, such as a web browser or web search, performing compilation, download or upload of an executable or script to an execution platform such as a server, and starting execution of a resulting executable or script. Many other variations and additional activities associated with copy and paste operations are possible and all are considered within the scope of the present subject matter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method comprising:
  associating, via a computing device and within a memory accessible by a content monitoring device that separately monitors security of content copy and paste operations performed by the computing device, source file type information of a source file with source file content copied from the source file in response to a copy operation of the source file content from the source file by the computing device;
  forwarding over a network, in response to determining that a content copy tracking rule created within the memory by remote operation of the content monitoring device specifies that a content copy alert feature has been enabled within the computing device by the content monitoring device, an automated content copy tracking alert to the content monitoring device that identifies at least the source file and that documents that the copy operation of the source file content from the source file was performed using the computing device;
  performing an automated conversion of the source file content copied from the source file to a form compatible with a target file type of a target file based upon differences between the source file type information and target file type information of the target file in response to a paste operation;
  forwarding over the network, in response to the paste operation of the source file content copied from the source file and in response to determining that a content paste tracking rule created within the memory by remote operation of the content monitoring device specifies that a content paste alert feature has been enabled within the computing device by the content monitoring device, an automated content paste tracking alert to the content monitoring device that identifies at least the source file and the target file to document that the paste operation was performed using the computing device;
  determining that the paste operation was to an email message; and
  including the email message itself within the automated content paste tracking alert forwarded to the content monitoring device.

2. The method of claim 1 further comprising generating the automated content copy tracking alert forwarded to the content monitoring device.

3. The method of claim 1, further comprising, in response to the copy operation, starting a web browser using the source file content copied from the source file and one of performing a web search using the source file content copied from the source file and retrieving a website specified by a uniform resource locator (URL) identified within the source file content copied from the source file.

4. The method of claim 1, where the source file content comprises computer programming language syntax captured in a first computer programming language identified by the source file type information, and where performing the automated conversion of the source file content copied from the source file to the form compatible with the target file type of the target file based upon differences between the source file type information and target file type information of the target file in response to the paste operation comprises performing the automated conversion of the source file content copied from the source file to a second computer programming language syntax of a second computer programming language identified by the target file type of the target file.

5. The method of claim 4, further comprising, in response to performing the automated conversion of the source file content:
    verifying that the converted source file content copied from the source file is in a form compatible with syntactic guidelines of the second computer programming language identified by the target file type of the target file based upon target file type information; and
    initiating a compilation operation for the target file comprising the converted source file content in the second computer programming language.

6. A system comprising:
a memory accessible by a content monitoring device that separately monitors security of content copy and paste operations performed by a computing device; and
the computing device programmed to:
    associate within the memory source file type information of a source file with source file content copied from the source file in response to a copy operation of the source file content from the source file by the computing device;
    forward over a network, in response to determining that a content copy tracking rule created within the memory by remote operation of the content monitoring device specifies that a content copy alert feature has been enabled within the computing device by the content monitoring device, an automated content copy tracking alert to the content monitoring device that identifies at least the source file and that documents that the copy operation of the source file content from the source file was performed using the computing device;
    perform an automated conversion of the source file content copied from the source file to a form compatible with a target file type of a target file based upon differences between the source file type information and target file type information of the target file in response to a paste operation;
    forward over the network, in response to the paste operation of the source file content copied from the source file and in response to determining that a content paste tracking rule created within the memory by remote operation of the content monitoring device specifies that a content paste alert feature has been enabled within the computing device by the content monitoring device, an automated content paste tracking alert to the content monitoring device that identifies at least the source file and the target file to document that the paste operation was performed using the computing device;
    determine that the paste operation was to an email message; and
    include the email message itself within the automated content paste tracking alert forwarded to the content monitoring device.

7. The system of claim 6, where the computing device is further programmed to generate the automated content copy tracking alert forwarded to the content monitoring device.

8. The system of claim 6, where the computing device is further programmed to, in response to the copy operation, start a web browser using the source file content copied from the source file and one of perform a web search using the source file content copied from the source file and retrieve a website specified by a uniform resource locator (URL) identified within the source file content copied from the source file.

9. The system of claim 6, where the source file content comprises computer programming language syntax captured in a first computer programming language identified by the source file type information, and where:
    in being programmed to perform the automated conversion of the source file content copied from the source file to the form compatible with the target file type of the target file based upon differences between the source file type information and target file type information of the target file in response to the paste operation, the processor is programmed to perform the automated conversion of the source file content copied from the source file to a second computer programming language syntax of a second computer programming language identified by the target file type of the target file; and
    where the computing device is further programmed to, in response to performing the automated conversion of the source file content:
        verify that the converted source file content copied from the source file is in a form compatible with syntactic guidelines of the second computer programming language identified by the target file type of the target file based upon target file type information; and
    initiate a compilation operation for the target file comprising the converted source file content in the second computer programming language.

10. A system comprising:
a content tracking database, accessible by a content monitoring device that separately monitors security of content copy and paste operations, and configured to store content tracking information and content tracking rules associated with the content copy and paste operations; and
a computing device configured to execute an application configured to track the content associated with the content copy and paste operations based upon the content tracking rules created within the content tracking database by remote operation of the content monitoring device, where the application is further configured to:
    associate within the content tracking database source file type information of a source file with source file content copied from the source file in response to a copy operation of the source file content from the source file by the computing device;
    forward over a network, in response to determining that a content copy tracking rule created within the content tracking database by remote operation of the content monitoring device specifies that a content copy alert feature has been enabled within the computing device by the content monitoring device, an automated content copy tracking alert to the content monitoring device that identifies at least the source file and that documents that the copy operation of the source file content from the source file was performed using the computing device;
    perform an automated conversion of the source file content copied from the source file to a form compatible with a target file type of a target file based upon differences between the source file type information and target file type information of the target file in response to a paste operation;

forward over the network, in response to the paste operation of the source file content copied from the source file and in response to determining that a content paste tracking rule created within the content tracking database by remote operation of the content monitoring device specifies that a content paste alert feature has been enabled within the computing device by the content monitoring device, an automated content paste tracking alert to the content monitoring device that identifies at least the source file and the target file to document that the paste operation was performed using the computing device;

determine that the paste operation was to an email message; and include the email message itself within the automated content paste tracking alert forwarded to the content monitoring device.

11. A computer program product comprising a computer useable storage device including a computer readable program, where the computer readable program when executed on a computer causes the computer to:

associate, via the computer and within a memory accessible by a content monitoring device that separately monitors security of content copy and paste operations performed by the computer, source file type information of a source file with source file content copied from the source file in response to a copy operation of the source file content from the source file by the computer;

forward over a network, in response to determining that a content copy tracking rule created within the memory by remote operation of the content monitoring device specifies that a content copy alert feature has been enabled within the computer by the content monitoring device, an automated content copy tracking alert to the content monitoring device that identifies at least the source file and that documents that the copy operation of the source file content from the source file was performed using the computer;

perform an automated conversion of the source file content copied from the source file to a form compatible with a target file type of a target file based upon differences between the source file type information and target file type information of the target file in response to a paste operation;

forward over the network, in response to the paste operation of the source file content copied from the source file and in response to determining that a content paste tracking rule created within the memory by remote operation of the content monitoring device specifies that a content paste alert feature has been enabled within the computer by the content monitoring device, an automated content paste tracking alert to the content monitoring device that identifies at least the source file and the target file to document that the paste operation was performed using the computer;

determine that the paste operation was to an email message; and include the email message itself within the automated content paste tracking alert forwarded to the content monitoring device.

12. The computer program product of claim 11, where the computer readable program when executed on the computer further causes the computer to generate the automated content copy tracking alert forwarded to the content monitoring device.

13. The computer program product of claim 11, where the computer readable program when executed on the computer further causes the computer to, in response to the copy operation, start a web browser using the source file content copied from the source file and one of perform a web search using the source file content copied from the source file and retrieve a website specified by a uniform resource locator (URL) identified within the source file content copied from the source file.

14. The computer program product of claim 11, where the source file content comprises computer programming language syntax captured in a first computer programming language identified by the source file type information, and where, in causing the computer to perform the automated conversion of the source file content copied from the source file to the form compatible with the target file type of the target file based upon differences between the source file type information and target file type information of the target file in response to the paste operation, the computer readable program when executed on the computer causes the computer to perform the automated conversion of the source file content copied from the source file to a second computer programming language syntax of a second computer programming language identified by the target file type of the target file.

15. The computer program product of claim 14, where the computer readable program when executed on the computer further causes the computer to, in response to causing the computer to perform the automated conversion of the source file content:

verify that the converted source file content copied from the source file is in a form compatible with syntactic guidelines of the second computer programming language identified by the target file type of the target file based upon target file type information; and initiate a compilation operation for the target file comprising the converted source file content in the second computer programming language.

\* \* \* \* \*